United States Patent [19]
Shinichi

[11] Patent Number: 4,852,980
[45] Date of Patent: Aug. 1, 1989

[54] OPTICAL SYSTEM

[75] Inventor: Nagata Shinichi, Kyoto, Japan

[73] Assignee: Dainippon Screen Manufacturing Co., Ltd., Kyoto, Japan

[21] Appl. No.: 3,957

[22] Filed: Jan. 16, 1987

[30] Foreign Application Priority Data

Jan. 31, 1986 [JP] Japan .................................. 61-21049

[51] Int. Cl.$^4$ ........................ G02B 13/18; G02B 27/00
[52] U.S. Cl. .................................. 350/432; 350/167; 353/102
[58] Field of Search ...................... 350/462, 432, 167; 353/102

[56] References Cited
U.S. PATENT DOCUMENTS 3,702,395 11/1972 Rosendahl ........................... 353/102
4,412,726 11/1983 Horimoto ........................... 350/462

Primary Examiner—Bruce V. Arnold
Assistant Examiner—Rebecca D. Gass
Attorney, Agent, or Firm—Brumbaugh, Graves, Donohue & Raymond

[57] ABSTRACT

An optical system for illuminating an object, including an entrance pupil for receiving light from a light source, an exit pupil for passing the light received to an object to be illuminated, and an optical axis which extends through the optical sytem to the light source and the object respectively, wherein the entrance height of the light received in the entrance pupil is substantially proportioned to the tangent of the exit angle in the exit pupil.

4 Claims, 12 Drawing Sheets

Prior Art

FIG. 27

Prior Art

Prior Art

FIG. 33

Prior Art

OPTICAL SYSTEM

BACKGROUND OF THE INVENTION

The present invention relates generally to a novel optical system, and particularly to an optical system which provides light of excellent uniformity of intensity, without any illuminance reduction in the peripheral area of an object, so that it is particularly useful for an exposure system applicable to exposure of printed circuit boards, integrated circuits or the like, for an exposure system applicable to contact exposure apparatus for plate making, step-and-repeat machines or the like, and for an illumination system applicable to copy machines or the like.

Figure 27:
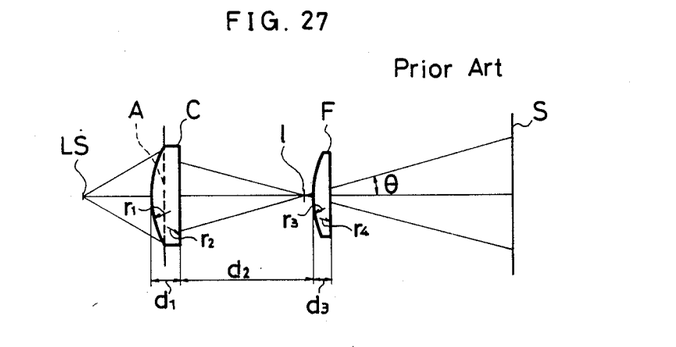
FIG. 27 is an elevational view of a conventional optical system.

It is well known that such a conventional condenser optical system as shown in FIG. 27 has been used in an illumination system which is intended to provide an illumination light for an entire object area uniformly and effectively. The conventional condenser optical system, referring to FIG. 27, comprises a condenser lens C and a field lens F. The condenser optical system is designed so that the real image of a light source LS, which is placed in front of the condenser lens C, is formed adjacent to the field lens F, and that the real image of an entrance pupil A of the condenser lens C is formed on an object S which is placed behind the field lens F.

Figure 28:
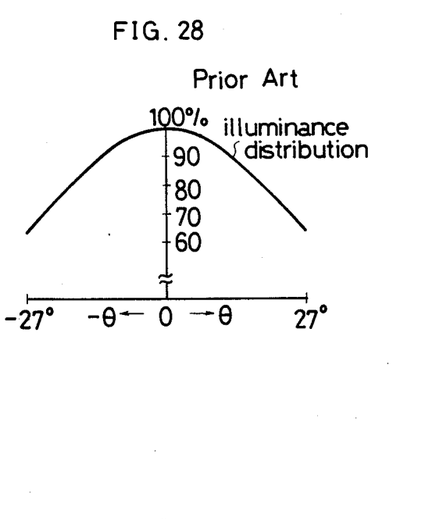
FIG. 28 is a graphic representation which shows characteristics of the conventional optical system.

The conventional condenser optical system, however, raises a serious problem, i.e. the illuminance in the peripheral area of the object is reduced, as shown in FIG. 28, in accordance with the cosine fourth law. For instance, referring to FIG. 27, the illuminance at the point on the object, where the exit angle $\theta$ forms 27 degrees relative to the optical system, is less than that at the point on the optical axis, i.e. the point where the exit angle $\theta$ forms zero degrees.

There are several reasons, other than the above-mentioned cosine fourth law, for the occurrence of illuminance reduction in the peripheral area of the object, which will be discussed in detail later. Actually, the illuminance in the peripheral area of the object is reduced less than a value derived from the cosine fourth law. According to the simulation calculation made by applying lens data listed in Table 1 to the optical system shown in FIG. 27, it is found that the illuminance at the point where the exit angle $\theta$ forms 27 degrees, is reduced by about 50 percent in comparison with the illuminance at the center thereof.

TABLE 1

| | r | d | n |
|---|---|---|---|
| 1 | 0.77 | 0.37 | 1.5 |
| 2 | ∞ | 0.46 | |
| 3 | 0.77 | 0.37 | 1.5 |
| 4 | ∞ | | | f = 1,
distance from the light source = 50,
distance from the object = 100

Figure 29:
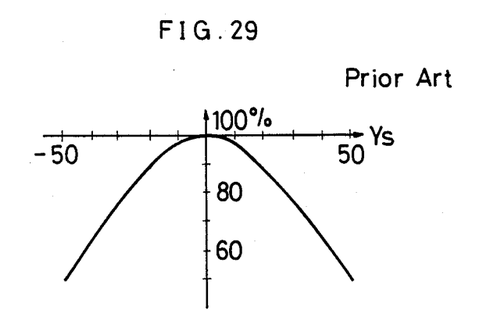
FIGS. 29 through 31 are respectively graphic representations of the illuminance distribution on the object, when using the conventional optical system.
Figure 30:
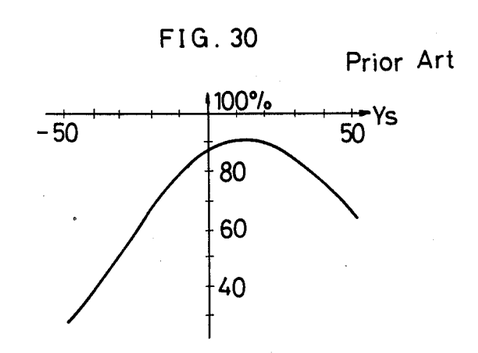
Figure 31:
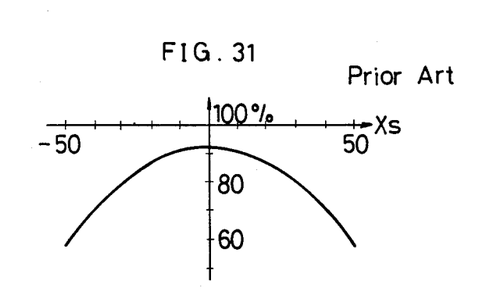

FIG. 29 shows an illuminance distribution on the object S, which is obtained by using the optical system shown in FIG. 27, in the case where a point source is positioned on the optical axis at the distance of 50 from the optical system. FIG. 30 shows an illuminance distribution of the meridional ray on the object S, and FIG. 31 shows an illuminance distribution of the sagittal ray on the object S, in each of which the point source is positioned away by 14 from the optical axis and at a distance of 50 from the optical system. The respective vertical axis of FIGS. 29 through 31 depicts a relative illuminance, in which the illuminance of the center of the object S is regarded as 100 percent when the point source is positioned on the optical axis. On the other hand, the respective horizontal axis of FIGS. 29 through 31 depicts a position on the object S. In FIGS. 29 through 31, the position denoted by 50 in radius corresponds to the position on which the exit light from the optical system is impinged.

As mentioned above, the illuminance in the peripheral area of the object S is actually reduced less than a value derived from cosine fourth law. One of the reasons therefor is an aberration, because the cosine fourth law is on the premise that an optical system has no aberration, whereas an actual optical system inevitably has the aberration.

Accordingly, it has conventionally been practiced that an optical system is designed so that the aberration be eliminated as far as possible, in other words it has commonly been practiced that an optical system is designed so as to satisfy the sine condition. Thus, even in an illumination system design, the optical system for use in illumination has conventionally been designed so as to satisfy the sine condition, because it has been believed as a matter of course by a person skilled in the art.

It has been found by the inventor, however, that designing an optical system so as to satisfy the sine condition causes an illuminance reduction in the peripheral area of the object to be illuminated.

Now, discussion is given with regard to the reasons why the illuminance reduction in the peripheral area of the object will be caused.

Figure 32:
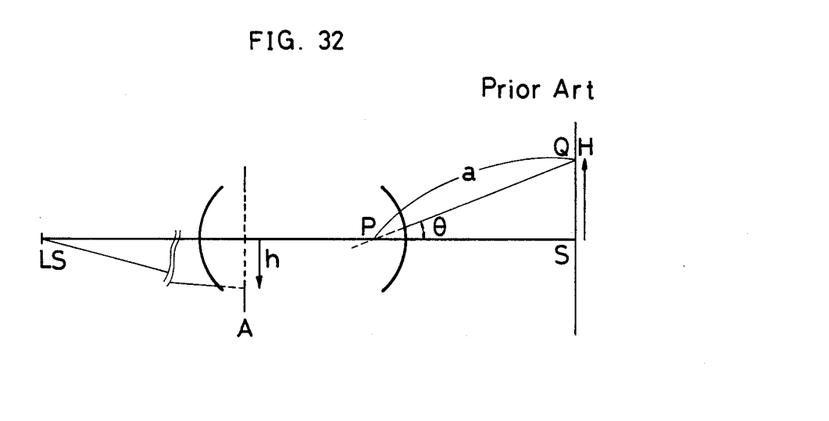
FIG. 32 a schematic elevational view of the conventional optical system.
Figure 33:
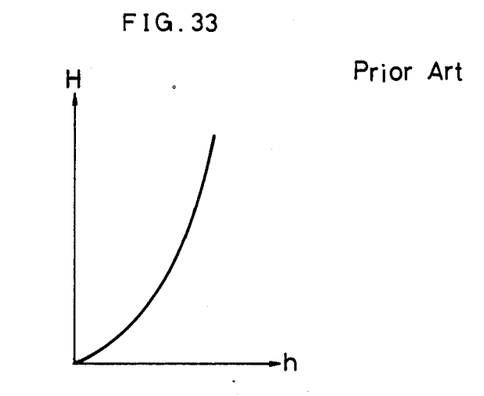
FIG. 33 is a graphic representation which shows the relationship between the entrance height and the illumination height.

Referring to FIG. 32, which is a schematic view of a typical optical system shown in FIG. 27, light emitted from the light source LS enters into the optical system at the entrance height h, in this case the light source LS can be regarded as being placed at an infinite distance from the optical system, because it is positioned at a far distance from the optical system in comparison with the focal length thereof. The real image of the light source LS is formed at a point P, and the light goes through an exit pupil at an exit angle $\theta$. Satisfying the sine condition means that the sine of the exit angle $\theta$ is proportioned to the entrance height h, accordingly the relation can be expressed by the following formula (1):

$$h = k_1 \sin \theta \tag{1}$$

where $k_1$ is a proportional constant.

The light which entered into the optical system at the entrance height h exits therefrom to impinge on the point Q of the object S. Then, $\sin \theta$ can be expressed by the following formula (2):

$$\sin \theta = \frac{H}{a} \tag{2}$$

where H is the distance between the point Q and the center of the object S (hereinafter referred as illumination height), and a is the distance between the point P and the point Q.

Accordingly, it can be transformed from the formulae (1) and (2), as follows:

$$H = \left(\frac{1}{k_1}\right) \cdot a \cdot h \qquad (3)$$

As can be understood from FIG. 32, when the entrance height h is increased, the exit angle $\theta$ will become large, hence the illumination height H will be increased in accordance therewith, and similarly the distance a between the point P and the point Q will also be increased. In the case that the entrance height h is increased at a constant rate, the illumination height H will be rapidly increased more than the increase of the entrance height h, since the illumination height H is proportioned to the product of the distance a and the entrance height h, as can be seen from the formula (3). Accordingly, the relationship between the incident light radius $A_o$ around the optical axis of the entrance pupil A and the radius $S_o$ of the illumination area of the object S, similarly to the relationship between the entrance height h and the illumination height H, is that the radius $S_o$ increases at a greater rate than the rate that the radius $A_o$ increases, from which it will be apparent that the illuminance on the object S will be reduced as it goes away from the optical axis, in comparison with that on the entrance pupil A.

Indeed in an image-formation optical system design it will be necessary to design the optical system so as to satisfy the sine condition because it is important to minimize the aberration, but in an illumination optical system design there is no need to do so. Furthermore, designing to satisfy the sine condition causes the illuminance reduction in the peripheral area of the object to be illuminated, as mentioned above.

In a conventional illumination system, it has been practiced in order to correct the illuminance reduction in the peripheral area of the object, that a gradient filter is placed in the optical path thereof, or that the light source is placed at a sufficient distance from the object. These conventional correction methods are, however, disadvantageous in view of the fact that light quantity is considerably reduced in the entire area of the object in the former method, and that the illumination system inevitably becomes large in size in the latter.

SUMMARY OF THE INVENTION

Accordingly, it is a principal object of the present invention to provide a novel optical system particularly useful for an illumination system.

It is another object to provide an optical system which provides an illumination on an object without any illuminance reduction in the peripheral area of the object.

The aforementioned objects are accomplished by the present invention, with an optical system which includes an entrance pupil for receiving light from a light source, an exit pupil for passing the light received to an object to be illuminated, and an optical axis which extends to the light source and the object respectively, through the optical system, wherein the entrance height of the light received in the entrance pupil is substantially proportioned to the tangent of the exit angle in the exit pupil. In other words, the optical system according to present invention is one that satisfies the formula:

$$\tan \theta \propto h \qquad (4)$$

where $\theta$ is an exit angle of the optical system, and h is an entrance height in the entrance pupil.

Then, the formula (4) can be expressed by the following formula:

$$\frac{h}{\tan \theta} = k \qquad (5)$$

where k is a proportional constant.

Accordingly, the optical system according to the invention is designed so that the formula (5) is substantially established therein, whereby the illuminance on the object is uniform through the entire area. In this case, the proportional constant k is not limited.

Having the aforementioned features, the present invention has the following useful advantages:

The illuminance reduction in the peripheral area of the object to be illuminated, which will be caused in accordance with the cosine fourth law, can be resolved to realize a uniform illumination distribution on the object.

The length of the optical path between the light source and the object can be extensively and effectively reduced, since the angular aperture is wide in the optical system according to the invention, whereas the wide range on the object can be evenly and uniformly illuminated thereby.

The light entered into the optical system can be effectively used for illumination of the object, without any loss of light.

The optical system is particularly useful for use in an illumination system of compact in size.

Other novel features and advantages of the invention will become apparent in the course of the following detailed description taken together with the accompanying drawings, which are directed only to the understanding of the present invention and not to the restriction of the scope of the invention.

DETAILED DESCRIPTION OF THE PREFERRED EMBODIMENTS

Figure 1:
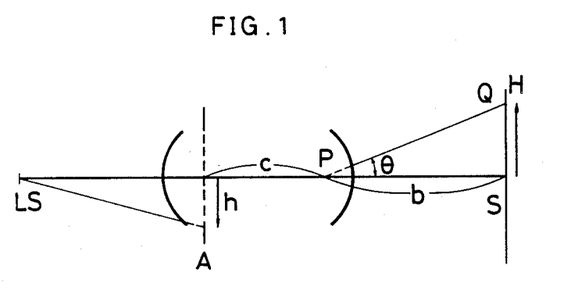
FIG. 1 is a schematic view of the optical system according to the present invention.

Referring to FIG. 1, which shows a schematic view of the optical system according to the invention, light emitted from a light source LS, which is positioned on the optical axis, enters into the optical system at the entrance height h, and in turn exits therefrom at the exit angle $\theta$, to illuminate the object S.

The optical system is designed so that the entrance height h is substantially proportioned to the tangent of the exit angle $\theta$, which is expressed by the formula (5), which can be transformed as follows:

$$h = k \tan \theta \quad (6)$$

Whereas, it will be apparent from FIG. 1 that the following formula is established:

$$\tan \theta = \frac{H}{b} \quad (7)$$

where H is an illumination height between the optical axis and the point on which the light entered at the entrance height h is impinged, and b is the distance between the object and the point P at which the real image of the light source LS is formed.

Accordingly, the following formula (8) is obtained from the formulae (6) and (7):

$$h = \frac{k}{b} \cdot H \quad (8)$$

Indeed the exit angle $\theta$ and the illumination height H are changed when the entrance height h is increased or decreased, however the distance b can be regarded as constant because the point P is changed in such a degree as caused by the aberration, which is so small as can be disregarded.

Figure 2:
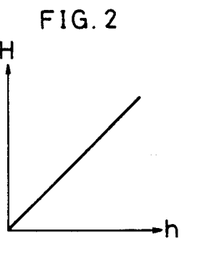
FIG. 2 is a graphic representation which shows the relationship between the entrance height and the illumination height.

Thus, in the optical system a substantially proportional relationship between the entrance height h and the illumination height H is established as shown in FIG. 2.

Accordingly, it will be apparent that the relationship between the radius $A_o$ around the optical axis, of the entrance pupil A, and the radius $S_o$ around it on the object S, within which the illumination is realized by the light entered through the radius $A_o$, is proportional similarly to the relationship between the entrance height h and the illumination height H. That is, when the value of the radius $A_o$ is increased, the value of the radius $S_o$ is increased at the same rate. From this, it will be apparent that the illuminance distribution on the object S is the same as that of the entrance pupil A, from the center to the peripheral area of the object.

FIRST EMBODIMENT

Figure 3:
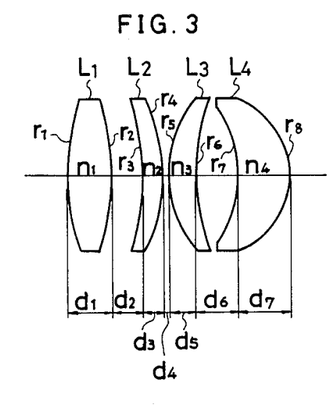
FIG. 3 is an elevational view of a first embodiment of the invention.

Referring to FIG. 3, which shows a first embodiment of the invention, the optical system shown therein comprises four optical units $L_1$ to $L_4$ including four lenses. Respective lens data of the optical system is listed in Table 2.

TABLE 2

|   | r      | d     | n     |
|---|--------|-------|-------|
| 1 | 1.651  | 0.287 | 1.671 |
| 2 | −1.984 | 0.229 |       |
| 3 | −2.694 | 0.172 | 1.671 |
| 4 | −1.261 | 0.029 |       |
| 5 | 0.803  | 0.229 | 1.671 |
| 6 | 1.68   | 0.287 |       |
| 7 | −0.917 | 0.401 | 1.684 |
| 8 | −0.585 |       |       | f = 1.0,
Effective Aperture = 1.0,
Maximum View Angle = 30 degrees

Figure 4:
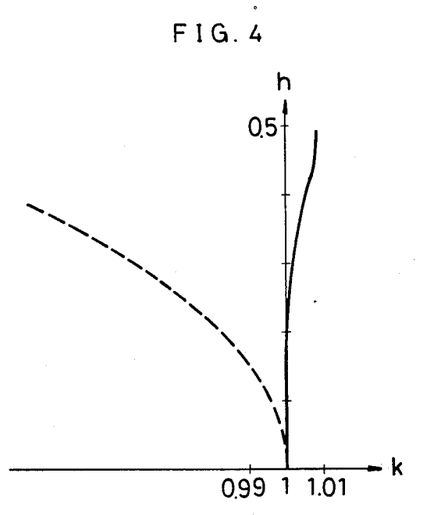
FIG. 4 is a graphic representation which shows the h-k characteristics of the first embodiment.

Referring to FIG. 4, there are shown the characteristics of the proportional constant k relative to the entrance height h when using the optical system shown in FIG. 3, where the vertical axis depicts the entrance height h, and the horizontal axis depicts the proportional constant k, which is expressed in the formula (5). The characteristics of the proportional constant k relative to the entrance height h (hereinafter referred as h-k characteristics) show the fidelity of the optical system to the ideal optical design of the present invention, from which the fact that the proportional constant k is constant independent of the entrance height h means that the optical system is designed to be ideal, i.e. the tangent of the exit angle 0 is exactly proportioned to the entrance height h.

In FIG. 4, the h-k characteristics of a conventional aplanatic lens are shown by a broken line for the purpose of comparison with the optical system shown in FIG. 3, from which it will be apparent that the optical system shown in FIG. 3 is very approximate to the ideal characteristics of the present invention, and that it is very different from the conventional aplanatic lens, because the fluctuation of the proportional constant k of the optical system shown in FIG. 3 is within the range of 0.008.

Figure 5:
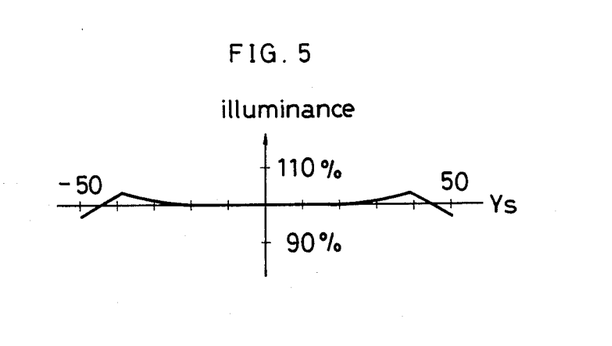
FIGS. 5 through 7 are, respectively, graphic representations of the illuminance distribution on the object, when using the first embodiment of the invention.
Figure 6:
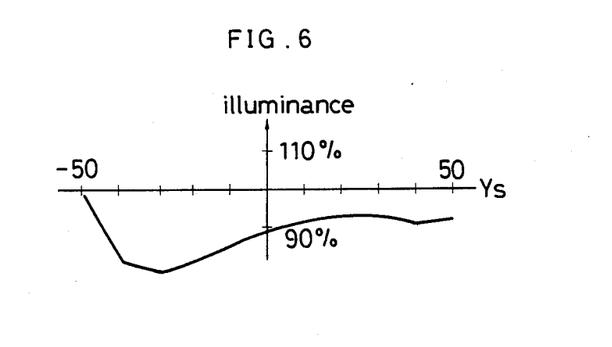
Figure 7:
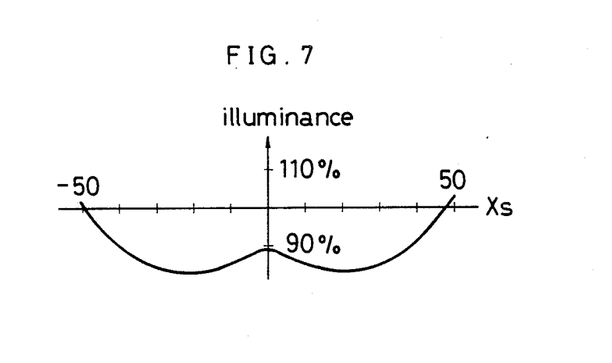

FIGS. 5 through 7 show an illuminance distribution on the object when using the optical system shown in FIG. 3, in which the object is placed at a distance of 100 from the optical system. FIG. 5 is a graphic representation of the illuminance distribution in the case where the point source is positioned on the optical axis at a distance of 50 from the front surface of the optical system, and FIGS. 6 and 7 are graphic representations of the illuminance distribution of the meridional ray and the sagittal ray on the object, respectively, where the point source is positioned away by 14 from the optical axis and at a distance of 50 from the front surface of the optical system. The respective vertical axis of FIGS. 5 through 7 depicts the relaive illuminance when the illuminance of the center of the object is regarded as 100 percent.

From FIGS. 4 through 7, it will be apparent that the range of 100 in diametre on the object can be illuminated evenly and uniformly by using the optical system shown in FIG. 3. Whereas, in the conventional optical system, the illuminance in the peripheral area of the object is disadvantageously reduced by 50 percent from the illuminance at the center thereof, as can be seen in FIG. 28.

SECOND EMBODIMENT

Figure 8:
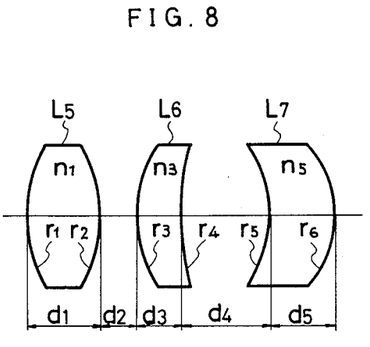
FIG. 8 is an elevational view of a second embodiment of the invention.

Referring to FIG. 8, which shows a second embodiment of the invention, the optical system shown therein comprises three optical units $L_5$ to $L_7$ including three lenses. The lens data of the optical system is listed in Table 3.

TABLE 3

| | r | d | n |
|---|---|---|---|
| 1 | 2.608 | 0.326 | 1.671 |
| 2 | −1.68 | 0.2 | |
| 3 | 0.848 | 0.326 | 1.671 |
| 4 | 3.26 | 0.341 | |
| 5 | −1.956 | 0.461 | 1.684 |
| 6 | −0.82 | | | f = 1.0,
Effective Aperture = 1.0,
Maximum View Angle = 30 degrees

Figure 9:
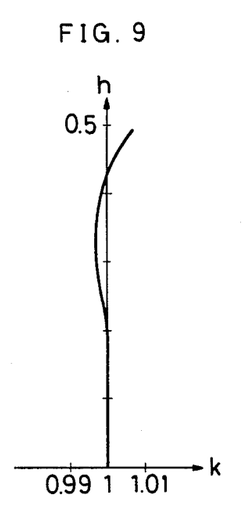
FIG. 9 is a graphic representation which shows the h-k characteristics of the second embodiment.
Figure 10:
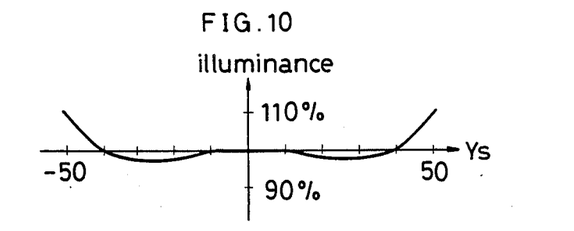
FIGS. 10 through 12 are, respectively, graphic representations of the illuminance distribution on the object, when using the second embodiment of the invention.
Figure 11:
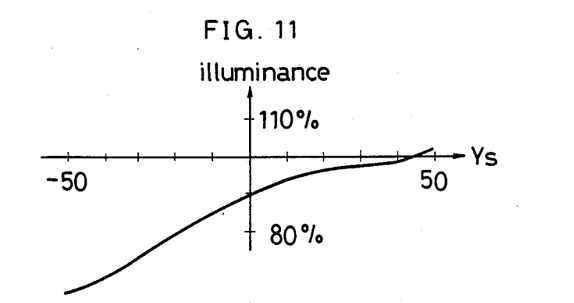
Figure 12:
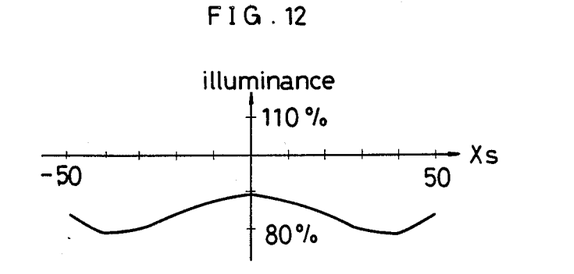

Referring to FIG. 9, there are shown the h-k characteristics of the optical system shown in FIG. 8. FIGS. 10 through 12 respectively show an illuminance distribution on the object S when using the optical system, in which the object S is placed at a distance of 100 from the rear surface of the optical system. FIG. 10 is a graphic representation of the illuminance distribution in the case where the point source is positioned on the optical axis at a distance of 50 from the front surface of the optical system. FIGS. 6 and 7 are graphic representations of the illuminance distribution on the meridional ray and the sagittal ray on the object respectively, in the case where the point source is positioned away by 14 from the optical axis and at a distance of 50 from the front surface of the optical system. The respective vertical axis of FIGS. 10 through 12 depicts the relative illuminance when the illuminance of a distance of 50 from the front surface of the optical system. The respective vertical axis of FIGS. 10 through 12 depicts the relative illuminance when the illuminance of the center of the object is regarded at 100 percent.

From FIGS. 9 through 12, it will be apparent that a range of 100 in diameter on the object can be illuminated evenly and uniformly by using the optical system shown in FIG. 8.

THIRD EMBODIMENT

Figure 13:
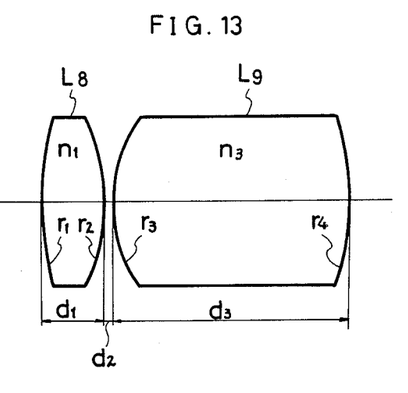
FIG. 13 is an elevational view of a third embodiment of the invention.

Referring to FIG. 13, which shows a third embodiment of the invention, the optical system shown therein comprises two optical units $L_8$ to $L_9$ including two lenses. The lens data of the optical system is listed in Table 4.

TABLE 4

| | r | d | n |
|---|---|---|---|
| 1 | 2.24 | 0.43 | 1.47 |
| 2 | −0.972 | 0.075 | |
| 3 | 0.747 | 1.494 | 1.47 |
| 4 | −0.747 | | | f = 1.0,
Effective Aperture = 1.0,
Maximum View Angle = 20 degrees

Figure 14:
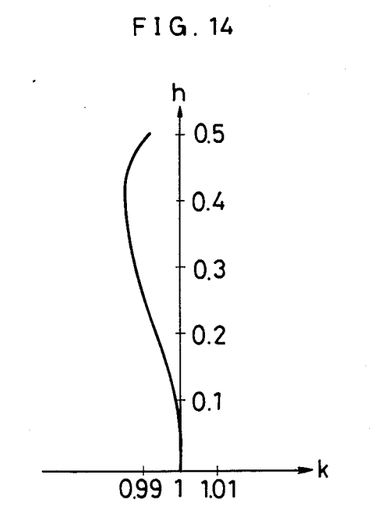
FIG. 14 is a graphic representation which shows the h-k characteristics of the third embodiment.
Figure 15:
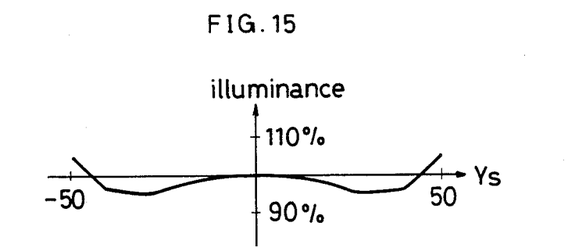
FIGS. 15 through 17 are, respectively, graphic representations of the illuminance distribution on the object, when using the third embodiment of the invention.
Figure 16:
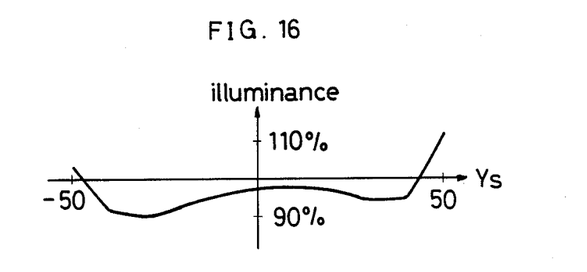
Figure 17:
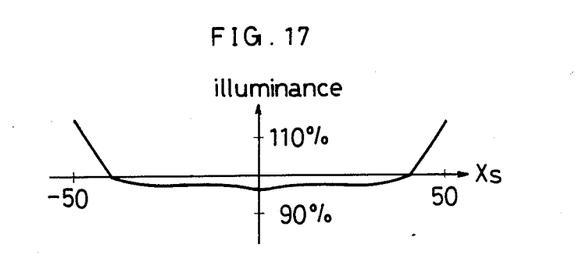

Referring to FIG. 14, there are shown the h-k characteristics of the optical system shown in FIG. 13. FIGS. 15 through 17 respectively shown an illuminance distribution on the object S when using the optical system, in which the object S is placed at a distance of 100 from the rear surface of the optical system. FIG. 15 is a graphic representation of the illuminance distribution in the case where the point source is positioned on the optical axis at an infinite distance from the front surface of the optical system. FIGS. 16 and 17 are graphic representations of the illuminance distribution on the meridional ray and the sagittal ray on the object respectively, in the case where the incident rays from the point source are entered into the optical system at the incident angle of 10 degrees. The respective vertical axis of FIGS. 15 through 17 depicts the relative illuminance when the illuminance of the center of the object is regarded as 100 percent.

From FIGS. 14 through 17, it will be apparent that a range of 100 on diameter on the object can be illuminated evenly and uniformly by using the optical system shown in FIG. 13.

FOURTH EMBODIMENT

Figure 18:
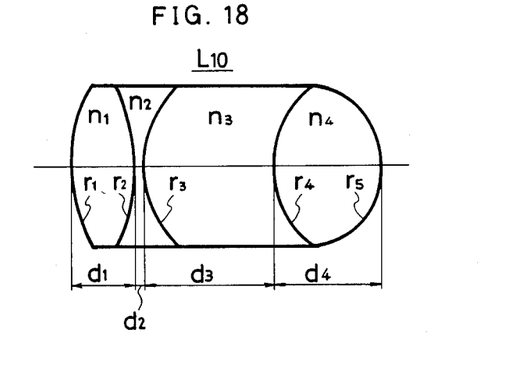
FIG. 18 is an elevational view of a fourth embodiment of the invention.

Referring to FIG. 18, which shows a fourth embodiment of the invention, the optical system shown therein comprises a single optical unit $L_{10}$ including four lenses. The lens data of the optical system is listed in Table 5.

TABLE 5

| | r | d | n |
|---|---|---|---|
| 1 | 1.224 | 0.408 | 1.811 |
| 2 | −0.79 | 0.076 | 1.516 |
| 3 | 0.612 | 0.816 | 1.811 |
| 4 | 0.704 | 0.561 | 1.679 |
| 5 | −0.53 | | | f = 1.0,
Effective Aperture = 0.80,
Maximum View Angle = 30 degrees

Figure 19:
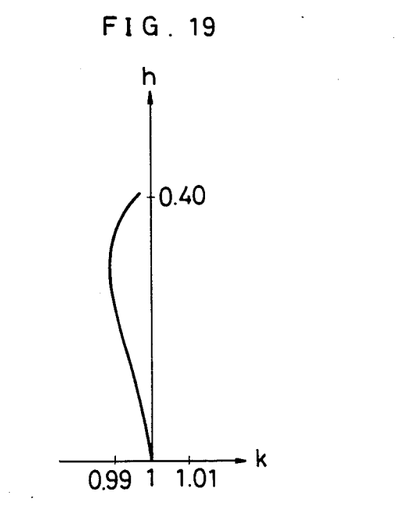
FIG. 19 is a graphic representation which shows the h-k characteristics of the fourth embodiment.
Figure 20:
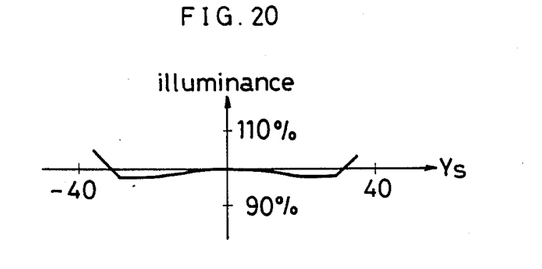
FIGS. 20 through 22 are respectively graphic representations of the illuminance distribution on the object, when using the fourth embodiment of the invention.
Figure 21:
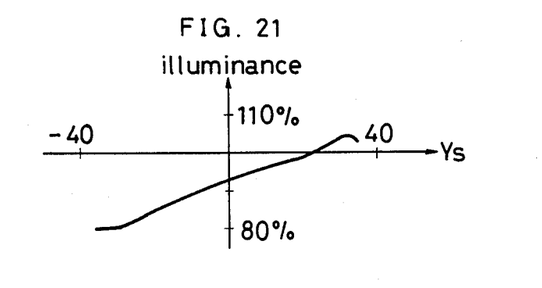
Figure 22:
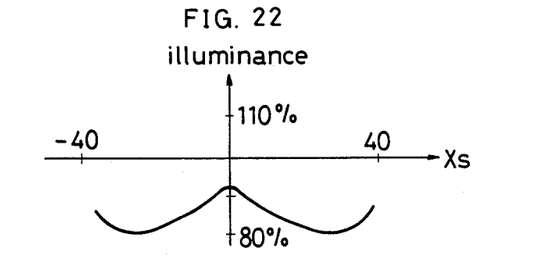

Referring to FIG. 19, there are shown the h-k characteristics of the optical system shown in FIG. 18. FIGS. 20 through 22 respectively show an illuminance distribution on the object S when using the optical system, in which the object is placed at a distance of 100 from the rear surface of the optical system. FIG. 20 is a graphic representation of the illuminance distribution in the case where the point source is positioned on the optical axis at a distance of 50 from the front surface of the optical system, and FIGS. 21 and 22 are graphic representations of the illuminance distribution of the meridional ray and the sagittal ray on the object respectively, in the case where the point source is positioned away by 14 from the optical axis and at a distance of 50 from the from the front surface of the optical system. The respective vertical axis of FIGS. 20 through 22 depicts the relative illuminance when the illuminance of the center of the object is regarded as 100 percent.

From FIGS. 19 through 22, it will be apparent that the range of 70 in diameter on the object can be illuminated evenly and uniformly by using the optical system shown in FIG. 18.

In the aforementioned four embodiments, only spherical lenses are used for the optical system, but an aspherical lens can also be used. The shape of the aspherical lens is designed as discussed below.

Returning back to FIG. 1, the tangent of the exit angle $\theta$ is expressed as follows:

$$\tan\theta = \frac{h}{C} \tag{9}$$

where h is an entrance height, and C is the distance between the entrance pupil A and the point P that the real image of the light source LS is formed.

Since the optical system according to the invention is designed so that the entrance height h is proportional to the tangent of the exit angle $\theta$, the following formula (10) is obtained from the formulae (6) and (9):

$$C = k \tag{10}$$

In the case where the light source LS can be regarded as being positioned at the infinite distance, the distance C is equivalent to the focal length f. Thus, the following formula (11) is established:

$$C = f \tag{11}$$

From the formulae (10) and (11), the following formula (12) is obtained:

$$k = f \tag{12}$$

Accordingly, the formula (5) can be transformed into the following formula (13):

$$\tan\theta = \frac{h}{f} \tag{13}$$

Figure 24:
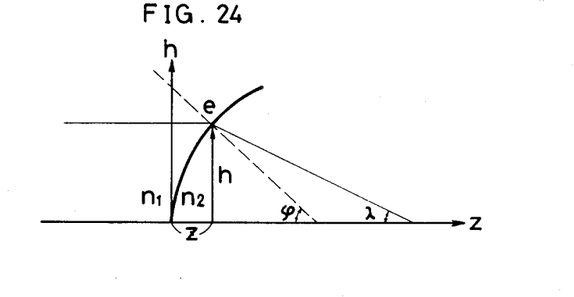
FIG. 24 is a schematic view of an optical system using an aspherical lens for explaining a refraction of the light entered thereinto.

Now, referring to FIG. 24, a symbol $n_1$ denotes the refractive index of a prior medium to the surface of an aspherical lens, a symbol $n_2$ denotes the refractive index of a posterior medium thereto, a symbol $\phi$ denotes the angle at the incident point e of the light from the infinite distance, between the normal of the surface and the optical axis, and a symbol $\lambda$ denotes the angle which the light refracted at the surface forms relative to the optical axis. Then, from Snell's law the following formula (14) will be established:

$$n_1 \sin\phi = n_2 \sin(\phi - \lambda) \tag{14}$$

By expanding formula (14), the formula (15) can be obtained:

$$n_1 \sin\phi = n_2 \sin\phi \cos\lambda - n_2 \cos\phi \sin\lambda \tag{15}$$

$$n_1 = n_2 \cos\lambda - n_2 \frac{\cos\phi}{\sin\phi} \cdot \sin\lambda$$

$$n_1 \tan\phi = n_2 \cos\lambda \tan\phi - n_2 \sin\lambda$$

$$\tan\phi = \frac{n_2 \sin\lambda}{n_2 \cos\lambda - n_1}$$

Now, a discussion is given with regard to the relational expression between the distance z and the distance h, which represents the shape of the surface of the aspherical lens. The inclination of the surface at the point e is expressed by dh/dz, and the inclination of the normal at the point e relative to the surface is expressed by $$\frac{1}{\frac{dh}{dz}}, \text{ i.e. } \frac{dz}{dh}.$$

Whereas, as apparent from FIG. 24, the inclination of the normal really is expressed by $\tan\phi$.

Accordingly, the formula (16) is established from the above:

$$\frac{dz}{dh} = \tan\phi \tag{16}$$

Then, from the formulae (15) and (16) obtained is the following formula (17):

$$\frac{dz}{dh} = \frac{n_2 \sin\lambda}{n_2 \cos\lambda - n_1} \tag{17}$$

Whereas, $\sin^2\lambda + \cos^2\lambda = 1$ and $\tan\lambda = \sin\lambda/\cos\lambda$, then these are transformed into $$\sin\lambda = \frac{\tan\lambda}{\sqrt{1 + \tan^2\lambda}} \text{ and}$$

$$\cos\lambda = \frac{1}{\sqrt{1 + \tan^2\lambda}},$$

hence these are further transformed, in consideration of the formula (13), into $$\sin\lambda = \frac{h}{\sqrt{f^2 + h^2}} \text{ and}$$

$$\cos\lambda = \frac{f}{\sqrt{f^2 + h^2}}.$$

Then, by substituting these for the formula (17) obtained is the following formula (18):

$$\frac{dz}{dh} = \frac{n_2 \cdot \frac{h}{\sqrt{f^2 + h^2}}}{n_2 \cdot \frac{f}{\sqrt{f^2 + h^2}} - n_1} \tag{18}$$

$$= \frac{n_2 h}{n_2 f - n_1 \sqrt{f^2 + h^2}}$$

Assuming f=1, the differential equation (18) is resolved as follows:

$$z = -\frac{n_2}{n_1}\sqrt{1 + h^2} - \left(\frac{n_2}{n_1}\right)^2 \log|n_1 - n_2\sqrt{1 + h^2}| + C \tag{19}$$

where C is an integration constant.

In the case where the intersection of the refraction surface and the optical axis is regarded as an origin of the z-axis, the integration constant C is expressed as the following formula (20):

$$C = \frac{n_2}{n_1} + \left(\frac{n_2}{n_1}\right)^2 \log|n_1 - n_2| \qquad (20)$$

FIFTH EMBODIMENT

Figure 23:
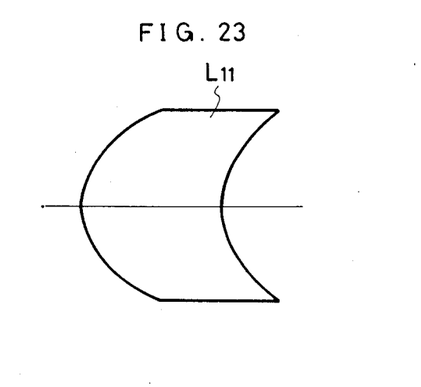
FIG. 23 is an elevational view of a fifth embodiment of the invention.

Referring to FIG. 23, which shows a fifth embodiment of the invention, the optical system shown therein comprises a single aspherical lens $L_{11}$.

In this embodiment, the aspherical lens $L_{11}$ is made of a material having a refractive index of 1.5. Whereas, the prior medium to the lens $L_{11}$ is an air, hence the refractive index thereof is 1.0. By substituting values $n_1 = 1$ and $n_2 = 1.5$ for the formulae (19) and (20), the following is obtained:

$$Z = -1.5\sqrt{1 + h^2} - 2.25\log|1 - 1.5\sqrt{1 + h^2}| - 0.06$$

Accordingly, the front shape of the aspherical lens $L_{11}$ is expressed by this formula, and the shape of the rear surface thereof is designed so as to satisfy the condition that the exit light is not refracted at the rear surface.

SIXTH EMBODIMENT

Figure 25:
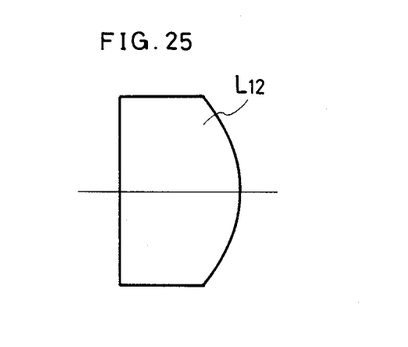
FIG. 25 is an elevational view of a sixth embodiment of the invention.

Referring to FIG. 25, which shows a sixth embodiment of the invention, the optical system shown therein comprises a single aspherical lens $L_{12}$. In this embodiment, the front surface of the aspherical lens $L_{12}$ forms a plane, and the aspherical lens $L_{12}$ is made of a material having a refractive index of 1.5. The rear surface thereof is designed as follows.

Since the prior medium to the refraction in the rear surface is the aspherical lens having the refraction index of 1.5, and the posterior medium thereto is an air having an index of 1.0. Thus, by substituting the values $n_1 = 1.5$ and $n_2 = 1.0$ for the formulae (19) and (20), the following is obtained:

$$z = -\frac{1}{1.5}\sqrt{1 + h^2} - \left(\frac{1}{1.5}\right)^2 \log|1.5 - \sqrt{1 + h^2}| + \frac{1}{1.5} + \left(\frac{1}{1.5}\right)^2 \log 0.5$$

The optical system according to the present invention can be designed as a fly-eye lens structure. The illumination system shown in FIG. 26 comprises a light source LS, an ellipsoidal mirror M, a fly-eye lens FE including a plurality of the optical systems as mentioned above and an object S.

Figure 26:
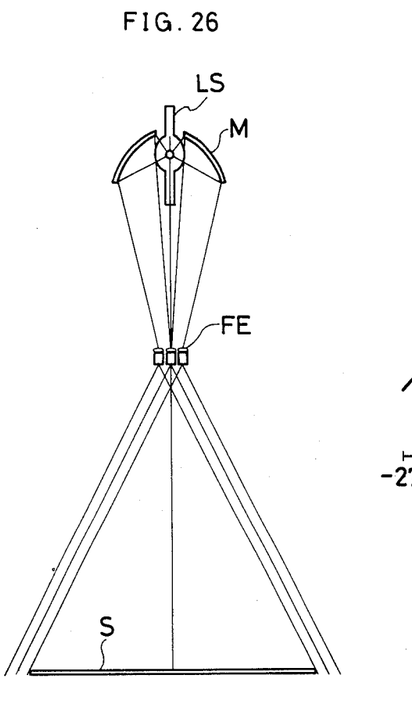
FIG. 26 a schematic view of an illumination system to which the invention is applied.

The fly-eye lens FE is designed so that respective optical axes of optical systems thereof run in parallel to each other, whereby a plurality of rays exited therefrom are impinged on the object S. The fly-eye lens structure is very useful for resolving the illuminance nonuniformity at the entrance pupil, which enables the object S to be illuminated uniformly independent of the illuminance distribution at the entrance pupil. In addition to this feature, respective optical system of the fly-eye lens provides uniform illumination through the entire area of the object, thus the illuminance distribution on the object will become very uniform.

It is actually preferable that the relationship between the entrance pupil A and the object S is conjugate, because the light source inevitably has a dimension. In the case where the illumination system is designed so that the entrance pupil is conjugated with the object to be illuminated, light passing through a predetermined common point in the entrance pupil will impinge on a predetermined common point on the object, and accordingly light emitted from the light source and received in the entrance pupil will illuminate the predetermined area of the object, without any loss of light quantity.

While the invention has been illustrated and described as embodied an optical system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An optical system for use in illuminating an object, comprising:
   a light source;
   lens means having an entrance pupil for receiving light from the light source and an exit pupil for passing the light received to the object; and
   an optical axis which extends through the lens means to the light source and the object, respectively, wherein the light received in the entrance pupil has an entrance height which is substantially proportioned to the tangent of the exit angle in the exit pupil.

2. An optical system as set forth in claim 1, wherein the entrance pupil is conjugated with the object.

3. An optical system as set forth in claim 1 wherein the lens means includes an aspherical lens having a surface designed so as to satisfy the formula:

$$z = -\frac{n_2}{n_1}\sqrt{1 + h^2} - \left(\frac{n_2}{n_1}\right)^2 \log|n_1 - n_2\sqrt{1 + h^2}| + \frac{n_2}{n_1} + \left(\frac{n_2}{n_1}\right)^2 \log|n_1 - n_2|$$

where $n_1$ is the refractive index of a prior medium to the surface of the aspherical lens, $n_2$ is the refractive index of a posterior medium to the surface thereof, and h is an entrance height in the entrance pupil.

4. An illumination system for illuminating an object, comprising:
   a light source; and
   a fly-eye lens structure including a plurality of respective optical systems, said respective optical systems each including an entrance pupil for receiving light from the light source, an exit pupil for passing the light received to the object, and an optical axis which extends to the light source and the object respectively, through the optical system, wherein the entrance height of the light received in the entrance pupil is substantially proportioned to the tangent of the exit angle in the exit pupil.

* * * * *

UNITED STATES PATENT AND TRADEMARK OFFICE
CERTIFICATE OF CORRECTION

PATENT NO. : 4,852,980

DATED : August 1, 1989

INVENTOR(S) : Shinichi Nagata

It is certified that error appears in the above-identified patent and that said Letters Patent is hereby corrected as shown below: On the title page:

First page, 2nd line of heading, "Shinichi" should read --Nagata--;

First page, Item 75, "Nagata Shinichi" should read --Shinichi Nagata--;

Column 6, line 48, "angle 0" should read --angle $\theta$--;

Column 7, line 9, "diametre" should read --diameter--;

Signed and Sealed this

Seventeenth Day of July, 1990

*Attest:*

HARRY F. MANBECK, JR.

*Attesting Officer*      *Commissioner of Patents and Trademarks*